United States Patent
Kalyanshetti et al.

(10) Patent No.: US 12,338,756 B2
(45) Date of Patent: Jun. 24, 2025

(54) WATER DRAINAGE ASSEMBLIES FOR AFTERTREATMENT SYSTEMS

(71) Applicant: CUMMINS EMISSION SOLUTIONS INC., Columbus, IN (US)

(72) Inventors: Shaila Sangmeshwar Kalyanshetti, Pune (IN); Jeffrey T. Sedlacek, Stoughton, WI (US); Collin P. Veele, Madison, WI (US); Douglas Robert Farnsworth, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 18/679,278

(22) Filed: May 30, 2024

(65) Prior Publication Data

US 2024/0309791 A1   Sep. 19, 2024

Related U.S. Application Data

(62) Division of application No. 18/094,846, filed on Jan. 9, 2023, which is a division of application No. 16/922,437, filed on Jul. 7, 2020, now Pat. No. 11,572,822.

(60) Provisional application No. 62/876,292, filed on Jul. 19, 2019.

(51) Int. Cl.
  *F01N 13/08*   (2010.01)
  *F01N 3/00*    (2006.01)
  *F01N 13/14*   (2010.01)

(52) U.S. Cl.
  CPC .......... *F01N 13/085* (2013.01); *F01N 3/005* (2013.01); *F01N 13/082* (2013.01); *F01N 13/141* (2013.01); *F01N 2470/00* (2013.01)

(58) Field of Classification Search
  CPC ...... F01N 3/005; F01N 13/082; F01N 13/085; F01N 13/141; F01N 2470/00
  See application file for complete search history.

(56) References Cited

U.S. PATENT DOCUMENTS

| | | |
|---|---|---|
| 2,609,886 A | 9/1952 | Harmon |
| 2,732,913 A | 1/1956 | Higgins |
| 4,059,045 A | 11/1977 | McClain |
| 4,106,290 A | 8/1978 | Johnson |
| 4,671,171 A | 6/1987 | Brill |
| D294,936 S | 3/1988 | Brill |
| 4,742,766 A | 5/1988 | Davison et al. |
| 4,821,629 A | 4/1989 | Davison et al. |
| 5,170,020 A | 12/1992 | Kruger et al. |
| 5,321,215 A | 6/1994 | Kicinski |
| 5,808,245 A | 9/1998 | Wiese et al. |

(Continued)

*Primary Examiner* — Audrey B. Walter
(74) *Attorney, Agent, or Firm* — Foley & Lardner LLP

(57) ABSTRACT

A water drainage assembly for an aftertreatment system includes: a first tube configured to be coupled to an outlet conduit of the aftertreatment system; a second tube having a first end coupled to an outer surface of the first tube, a second end opposite the first end, and an intermediate portion located between the first end and the second end; and a baffle plate located in the second tube. The intermediate portion of the second tube surrounds an end portion of the first tube such that a volume is defined between the end portion of the first tube and the intermediate portion of the second tube. The second tube comprises a drain port configured to allow water to drain from the volume defined between the end portion of the first tube and the intermediate portion of the second tube.

20 Claims, 9 Drawing Sheets

(56) References Cited

U.S. PATENT DOCUMENTS

| | | |
|---|---|---|
| 6,802,387 B1 | 10/2004 | Kreger et al. |
| 7,347,044 B1 | 3/2008 | Lubenow et al. |
| 7,779,961 B2 | 8/2010 | Matte |
| 9,103,262 B2 | 8/2015 | Prenger et al. |
| 9,115,632 B2 | 8/2015 | Wolfcarius et al. |
| 2006/0157296 A1 | 7/2006 | Belisle |
| 2007/0039316 A1 | 2/2007 | Bosanec et al. |

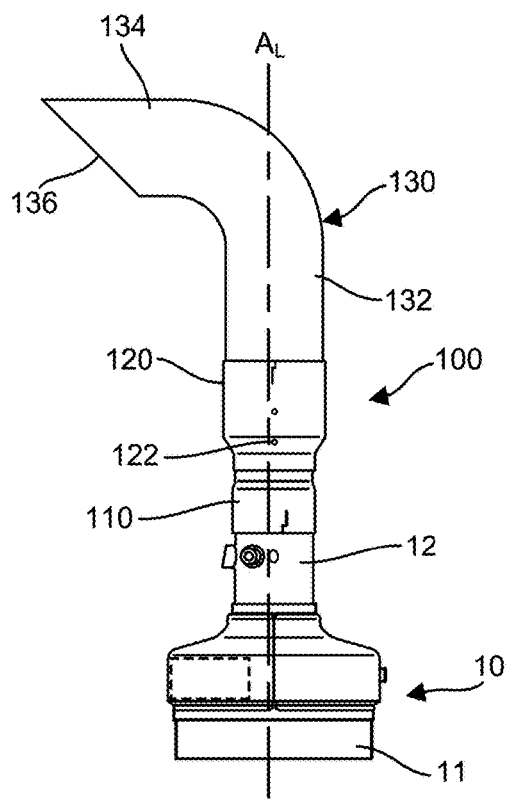
FIG. 1
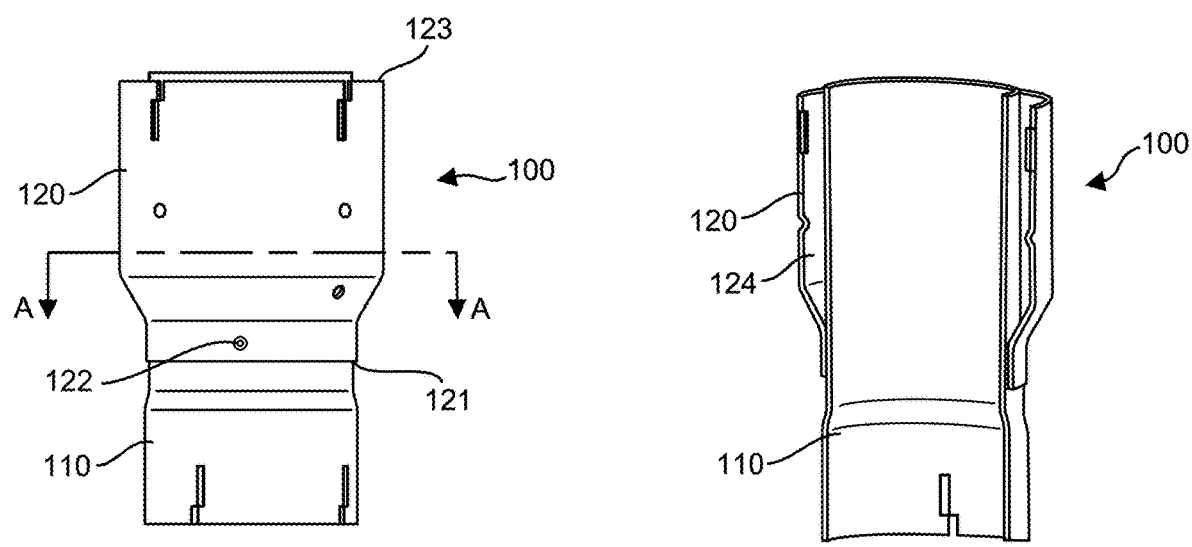
FIG. 2
FIG. 3

WATER DRAINAGE ASSEMBLIES FOR AFTERTREATMENT SYSTEMS

CROSS-REFERENCE TO RELATED APPLICATIONS

The present application is a divisional of U.S. patent application Ser. No. 18/094,846, filed Jan. 9, 2023, which is a divisional of U.S. patent application Ser. No. 16/922,437, filed Jul. 7, 2020, now U.S. Pat. No. 11,572,822, which claims the benefit of U.S. Provisional Application No. 62/876,292, filed Jul. 19, 2019. The disclosures of these applications are hereby incorporated by reference in their entireties.

TECHNICAL FIELD

The present disclosure relates generally to water drainage assemblies for aftertreatment systems.

BACKGROUND

Aftertreatment systems are generally used to treat exhaust gas generated by internal combustion engines such as diesel engines or gasoline engines. Aftertreatment systems may include various components, for example, a selective catalytic reduction (SCR) catalyst, oxidation catalysts, filters, mixers, baffles, etc. packaged inside a housing. Some aftertreatment systems or at least the tailpipes of the aftertreatment systems are oriented substantially vertically with respect to gravity. During rainy weather, for example, water can enter the tail pipe and flow into the aftertreatment system, which is detrimental to the performance of the aftertreatment system.

SUMMARY

Embodiments described herein relate generally to water drainage assemblies for inhibiting water (e.g., rainwater) from entering aftertreatment systems, and in particular, to water drainage assemblies that include a first tube and a larger diameter second tube disposed radially around the first tube. Water flows into the second tube around the first tube and is drained from the second tube via a drain port defined in the second tube.

In some embodiments, a water drainage assembly for an aftertreatment system comprises: a first tube structured to be coupled to an outlet conduit of the aftertreatment system, the first tube having a first cross-sectional width; a second tube disposed radially around the first tube, a first end of the second tube coupled to a radially outer surface of the first tube, a portion of the second tube having a second cross-sectional width that is larger than the first cross-sectional width such that a volume is defined between the first tube and the second tube; and a drain port defined in the second tube proximate to the first end of the second tube, wherein the water drainage assembly is structured such that water flowing into the water drainage assembly flows into the volume defined between the first tube and the second tube and is expelled therefrom via the drain port.

In some embodiments, a water drainage assembly for an aftertreatment system, comprises: a tube coupled to an outlet conduit of the aftertreatment system; and a pipe cover coupled to an outlet of the tube, the pipe cover comprising: a substantially conical main body configured to inhibit water from entering the tube, and a plurality of arms extending from the substantially conical main body inwardly towards the tube, the plurality of arms coupled to the tube such that gaps are defined between adjacent arms of the plurality of arms to allow exhaust gas to flow therethrough.

In some embodiments, a water drainage assembly for an aftertreatment system, comprises: a first tube fluidly coupled to the aftertreatment system, the aftertreatment system being oriented vertically with respect to gravity and the first tube being oriented substantially perpendicular with respect to a longitudinal axis of the aftertreatment system; and a second tube fluidly coupled to the first tube, the second tube being oriented substantially parallel to the longitudinal axis of the aftertreatment system, the second tube having a first end and a second end that is that is located at a lower elevation than the first end, the second tube being open at each of the first end and the second end such that water entering the second tube via the first end exits the second tube through the second end while being inhibited from entering the first tube.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 1 is a side perspective view of a portion of an aftertreatment system having a water drainage assembly coupled thereto, according to an embodiment.

FIG. 2 is a side perspective view of the water drainage assembly of FIG. 1.

FIG. 3 is a cross-section view of the water drainage assembly of FIG. 2 taken along the line A-A in FIG. 2.

Figure 4:
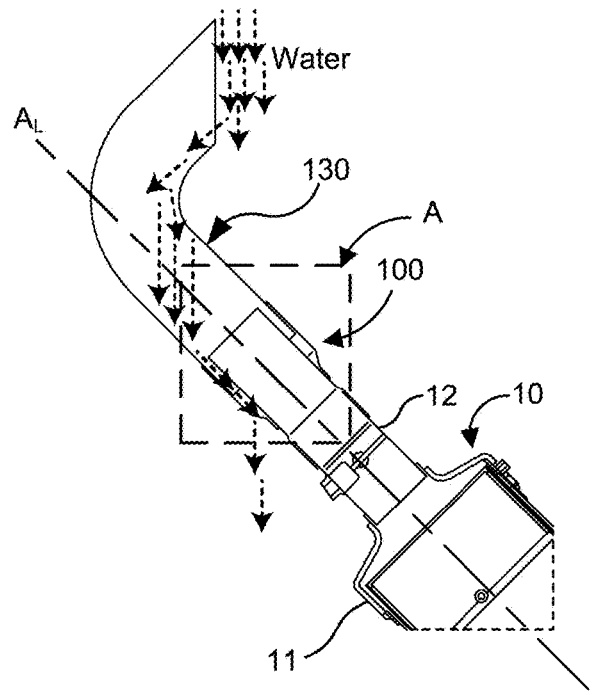
FIG. 4 is a side cross-section view of the aftertreatment system of FIG. 1 and the water drainage assembly being inclined at an inclination angle α with respect to gravity and water falling in a direction that is parallel to the direction of gravity.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to water drainage assemblies for inhibiting water (e.g., rainwater) from entering aftertreatment systems, and in particular, to water drainage assemblies that include a first tube and a larger diameter second tube disposed radially around the first tube. Water flows into the second tube around the first tube and is drained from the second tube via a drain port defined in the second tube.

Embodiments of the water drainage assemblies described herein may provide one or more benefits including, for example: (1) inhibiting water (e.g., rainwater) from flowing into the aftertreatment system; (2) collecting and draining water via a drain port so as to inhibit water from overflowing into the aftertreatment system; (3) providing the flexibility of mounting the water drainage assembly vertically with respect to gravity regardless of the orientation of the aftertreatment system; and (4) providing flexibility in mounting the water drainage assembly to allow fitment into available space.

Referring to FIGS. 1-3, an aftertreatment system 10 having a water drainage assembly 100 coupled thereto is shown, according to an embodiment. The aftertreatment system 10 includes a housing 11 defining an internal volume within which components of the aftertreatment system 10 are disposed. The aftertreatment system 10 is configured to treat an exhaust gas flowing therethrough. In some embodiments, the exhaust gas may include a diesel exhaust gas and the components may include a SCR system, an oxidation catalyst, filters (e.g., diesel particulate filters), mixers, baffle plates, etc. In the embodiment shown in FIG. 1, a longitudinal axis $A_L$ of the aftertreatment system 10 is oriented vertically with respect to gravity. An outlet conduit 12 extends from a longitudinal end of the housing 11 and is configured to expel treated exhaust gas from the aftertreatment system 10.

The water drainage assembly 100 is coupled to the outlet conduit 12 of the aftertreatment system 10, and configured to inhibit water (e.g., rainwater) from entering the outlet conduit 12 and thereby the aftertreatment system 10. The water drainage assembly 100 includes a first tube 110 coupled to the outlet conduit 12. The first tube 110 has a first cross-sectional width, for example, a first diameter. A second tube 120 is disposed radially around the first tube 110. A first end 121 of the second tube 120 that is located proximate to the outlet conduit 12 is coupled to a radially outer surface of the first tube 110. At least a portion of the second tube 120 has a second cross-sectional width, for example, diameter, that is larger than the first cross-sectional width of the first tube 110. For example, as shown in FIGS. 1-3, the second tube 120 is concentric with the first tube 110, and has a larger diameter such that the second tube 120 surrounds the first tube 110, and a volume 124 is defined therebetween. The second tube 120 is tapered at the first end 121 towards the first tube 110 and is coupled (e.g., welded) thereto.

A drain port 122, for example, a circular opening, is defined in the second tube 120 proximate to the first end 121 of the second tube 120. The drain port 122 may have a diameter in a range of 6 mm to 10 mm, inclusive. The second tube 120 is structured such that water flowing into the water drainage assembly 100 flows into the volume 124 between the second tube 120 and the first tube 110, and is expelled from the volume 124 via the drain port 122, and is thus inhibited from flowing into the aftertreatment system 10.

In some embodiments, the water drainage assembly 100 also comprises a tail pipe 130 coupled to a second end 123 of the second tube 120 that is opposite the first end 121 of the second tube 120. The tail pipe 130 may have a cross-sectional width, for example, diameter corresponding to the second cross-sectional width of the second tube 120. The tail pipe 130 includes a tail pipe first portion 132 coupled to the second end 123 of the second tube 120 and axially aligned with the second tube 120. The tail pipe 130 also includes a tail pipe second portion 134 extending at a non-zero angle from the tail pipe first portion 132. In some embodiments, the angle may be about 90 degrees, i.e., the second tube 120 has a 90 degree bend.

Figure 5:
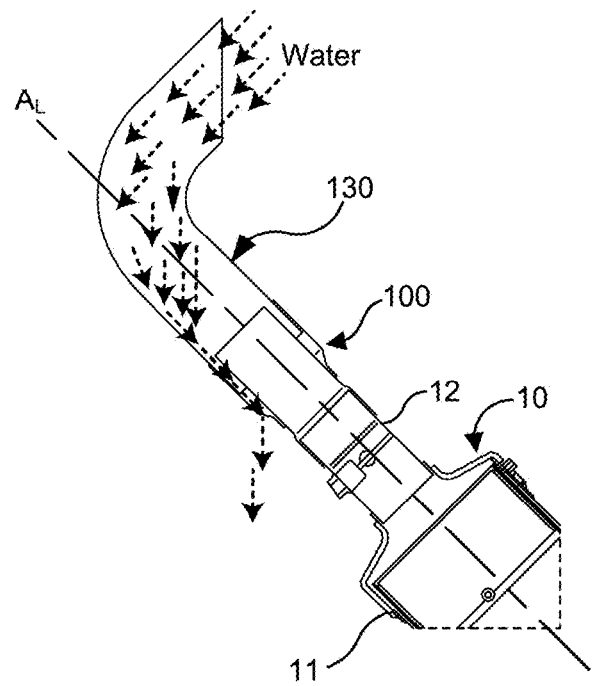
FIG. 5 is a side cross-section view of the aftertreatment system of FIG. 1, with the aftertreatment system and the water drainage assembly being inclined at an angle α with respect to gravity, but with water falling at a non-zero angle with respect to gravity.

An outlet 136 of the tail pipe 130 is slanted inwards towards the tail pipe first portion 132. The slanted outlet 136 inhibits water (e.g., rainwater) from entering the tail pipe second portion 134 via the outlet 136 when the tail pipe second portion 134 is oriented horizontally with respect to gravity and water is falling vertically with respect to gravity. For example, referring to FIGS. 4-6, the aftertreatment system 10 may be inclined at an angle (e.g., an angle of about 30 degrees to 60 degrees) with respect to gravity changing the orientation of the slanted outlet 136 as shown in FIG. 4. In some instances, water may fall vertically with respect to gravity and flow into the tail pipe 130, as shown in FIG. 4. In such instances, water flows along an inner surface of the tail pipe second portion 134 and drops into the tail pipe first portion 132. The water than flows along the inner surface of the tail pipe first portion 132 into the second tube 120 and is expelled from the water drainage assembly 100 through the drain port 122. In other instances, water may fall at an angle towards the outlet 136 as shown in FIG. 5, for example, in a direction that is axially aligned with a longitudinal axis of the tail pipe first portion 132. In such instances, water flows along the inner surface of the tail pipe first portion 132 into the second tube 120 and out of the drain port 122. Regardless of the orientation of the water drainage assembly 100 or direction of water flow, exhaust gas can flow out of the outlet conduit 12, and through the first tube 110 and the tail pipe 130 into the environment.

Figure 6:
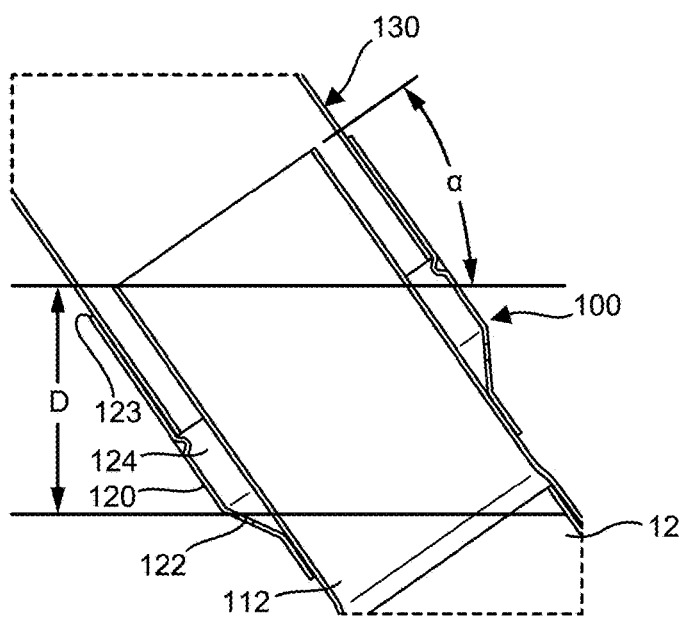
FIG. 6 is a side cross-section view of a portion of the water drainage assembly of FIG. 4 indicated by the arrow A in FIG. 4.

FIG. 6 shows a portion of the water drainage assembly 100 indicated by the arrow A in FIG. 4. A vertical height D of the second tube 120 measured from the drain port 122 to the second end 123 may be defined based on an angle of inclination α of the aftertreatment system 100, and thereby the water drainage assembly 100 with respect to gravity. For example, in some embodiments, the angle of inclination may be in a range of 20-60 degrees (e.g., 20, 25, 30, 35, 40, 45, 50, 55, or 60 degrees, inclusive), and the height D may be in a range of 90 mm to 110 mm (e.g., 90, 95, 100, 105, or 110 mm, inclusive).

Figure 7:
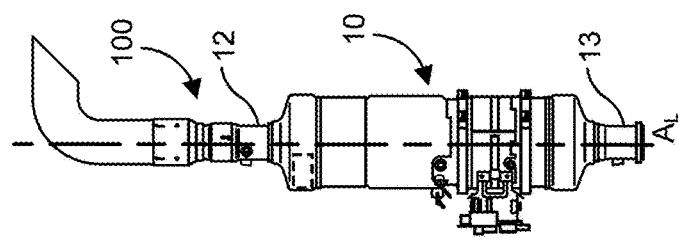
FIG. 7 is a side perspective view of the aftertreatment system of FIG. 1, with the aftertreatment system being oriented substantially vertically with respect to gravity, and the water drainage assembly being also oriented vertically with respect to gravity, according to an embodiment.

The water drainage assembly 100 is configured for modular assembly and can be mounted in a substantially vertical orientation with respect to gravity (e.g., oriented at an angle within +5 degrees with respect to the gravity vector) regardless of the orientation or configuration of the aftertreatment system 10. For example, FIG. 7 shows a side perspective view of the aftertreatment system 10 of FIG. 1. The longitudinal axis $A_L$ of the aftertreatment system 10 is oriented vertically with respect to gravity (e.g., aligned at an angle of about 0 degrees with respect to the gravity vector), and includes an inlet conduit 13 and the outlet conduit 12, each of which are axially aligned with the longitudinal axis $A_L$. The first tube 110 of the water drainage assembly 100 is coupled to the outlet conduit 12 to mount the water drainage assembly 100 vertically with respect to gravity.

Figure 8:
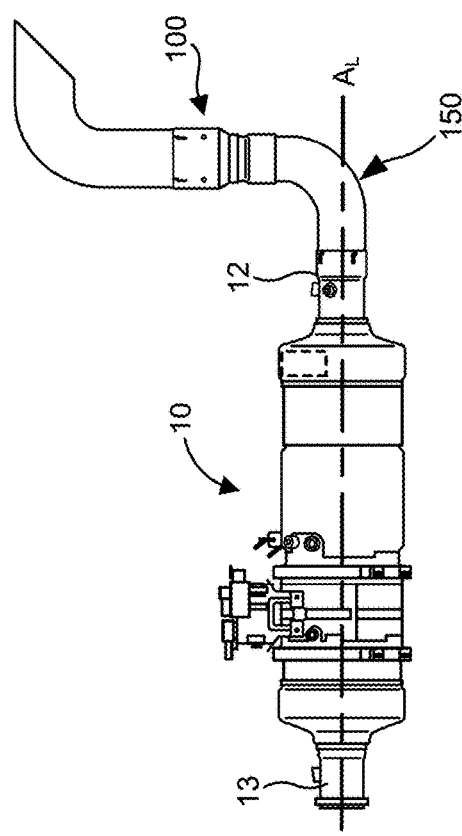
FIG. 8 is a side perspective view of the aftertreatment system of FIG. 1, with the aftertreatment system oriented substantially horizontally with respect to gravity, and the water drainage assembly oriented substantially vertically with respect to gravity, according to an embodiment.

FIG. 8 shows the aftertreatment system 10 oriented horizontally with respect to gravity (e.g., oriented at an angle of about 90 degrees with respect to gravity). To mount the water drainage assembly 100 vertically with respect to gravity, a connecting tube 150 is used. The connecting tube 150 has a 90 degree bend. A first end of the connecting tube 150 is coupled to the outlet conduit 12, and a second end of the connecting tube 150 is coupled to the first tube 110 such that the first tube 110 and the second tube 120 of the water drainage assembly 100 are oriented vertically with respect to gravity.

Figure 9:
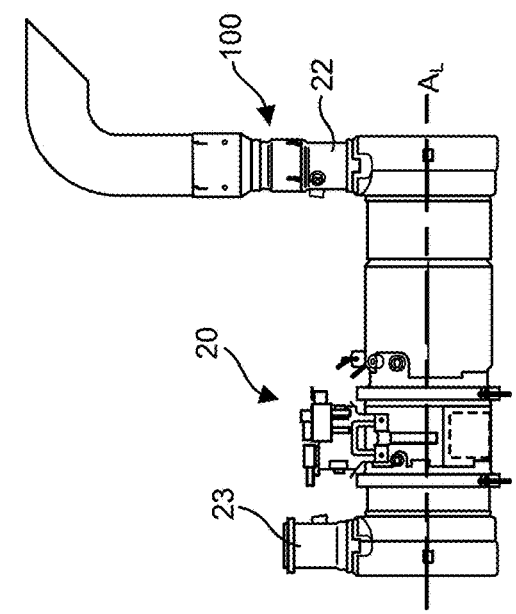
FIG. 9 is a side perspective view of an aftertreatment system that is oriented substantially horizontally with respect to gravity, and including an inlet and outlet conduits that are coupled to a sidewall of the aftertreatment system and oriented vertically with respect to gravity, the water drainage assembly of FIG. 1 being coupled to the outlet conduit and is also oriented substantially vertically with respect to gravity, according to an embodiment.

FIG. 9 shows a side-perspective view an aftertreatment system 20, according to another embodiment. A longitudinal axis $A_L$ of the aftertreatment system 20 is oriented horizontally with respect to gravity. The aftertreatment system 20 includes an inlet conduit 22 and an outlet conduit 22 that are coupled to a sidewall of the aftertreatment system 20 perpendicular to the longitudinal axis $A_L$ of the aftertreatment system 10, and are oriented vertically with respect to gravity. The water drainage assembly 100 is coupled to the outlet conduit 22 as described with respect to FIG. 7 and is oriented vertically with respect to gravity.

Figure 10:
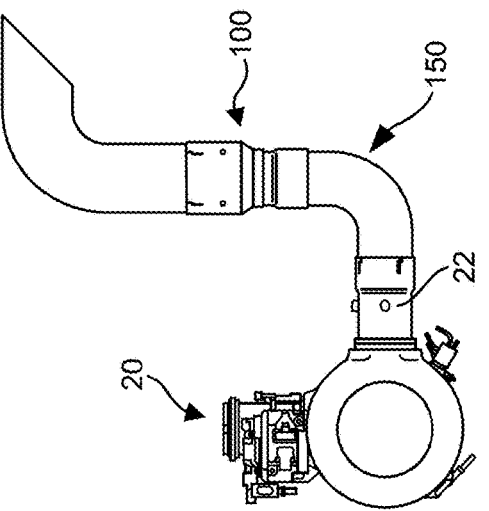
FIG. 10 is a front perspective view of the aftertreatment system of FIG. 9 positioned such that the inlet and outlet conduits are also oriented substantially horizontally with respect to gravity, and the water drainage assembly is oriented vertically with respect to gravity.

FIG. 10 shows a front perspective view of the aftertreatment system 20, oriented such that the longitudinal axis $A_L$ thereof is oriented horizontally with respect to gravity, and the inlet and outlet conduits 21, 22 thereof are also oriented horizontally with respect to gravity. In such embodiments, the connecting tube 150 is used to mount the water drainage assembly 100 to the outlet conduit 22 vertically with respect to gravity, as described with respect to FIG. 8.

Figure 12:
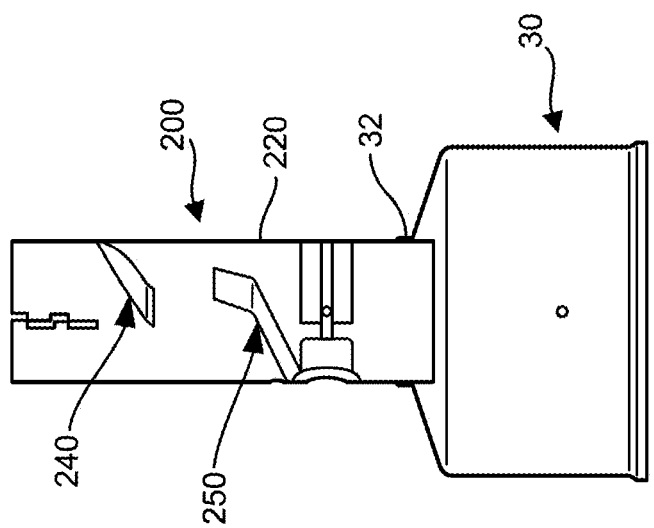
FIG. 12 is another side cross-section view of the water drainage assembly of FIG. 11 showing the water drainage assembly being coupled to an outlet conduit of an aftertreatment system.
Figure 11:
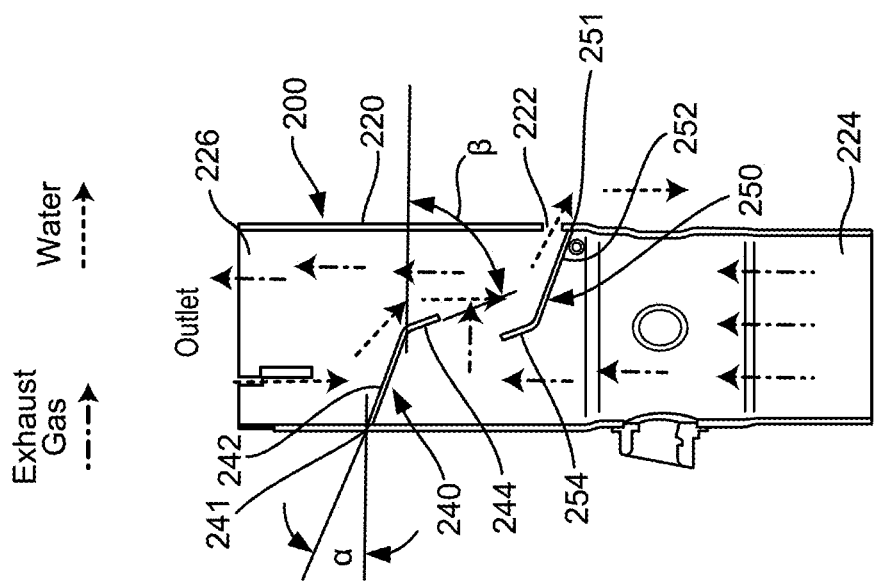
FIG. 11 is a side cross-section view of a water drainage assembly including a first baffle and a second baffle, according to an embodiment.

In some embodiments, a water drainage assembly may include one or more baffles to guide water (e.g., rainwater) entering the water drainage assembly towards a drain port thereof. Referring now to FIGS. 11-12, a water drainage assembly 200 is shown, according to an embodiment. The water drainage assembly 200 includes a tube 220 having an inlet 224 structured to be coupled to an outlet conduit 32 of an aftertreatment system 30 (e.g., the aftertreatment system 10). In some embodiments, the tube 220 may include the second tube 120, disposed around the first tube 110. In such embodiments, the tube 220 is coupled to the outlet conduit 32.

A drain port 222 is defined proximate to an end of tube 220 that is coupled to the outlet conduit 32. A first baffle 240 is disposed in the tube 220, and a second baffle 250 is disposed in the tube 220 below the first baffle 240. A first baffle first end 241 off the first baffle 240 is attached to an inner surface of the tube 220 at a first location such that the first baffle 240 is inclined at a first baffle first angle α (e.g., in a range or 20-40 degrees, inclusive) from the inner surface of the tube 220 downwards with respect to gravity. Furthermore, a second baffle second end 251 of the second baffle 250 is coupled to the inner surface of the tube 220 at a second location that is opposite to, and below the first location with respect to gravity. The second baffle 250 is inclined at second baffle second angle which may be substantially the same as the first baffle first angle α (e.g., in a range or 20-40 degrees, inclusive) from the inner surface upwards with respect to gravity towards the first baffle 240. Each baffle 240 and 250 may have a semi-circular shape, and the inclination of baffles 240, 250 directs the exhaust gas towards an outlet 226 of the tube 220

As shown in FIG. 11, the first baffle 240 is structured to guide water entering the tube 220 towards the second baffle 250, and the second baffle 250 is structured to guide the water towards the drain port 222. In particular embodiments as shown in FIG. 11, the first baffle 240 includes a first baffle first portion 242 that is coupled to the tube 220 and inclined at the first baffle first angle α (e.g., in a range or 20-40 degrees, inclusive). A first baffle second portion 244 extends from first baffle first portion 242 at a first baffle second angle ß larger than the first baffle first angle α (e.g., in a range of 30-60 degrees, inclusive) towards the second baffle 250. The second baffle 250 comprises a second baffle first portion 252 that is coupled to the tube 220 and inclined at the second baffle first angle, and a second baffle second portion 254 extending from the second baffle first portion 252 at a second baffle second angle, larger than the second baffle first angle, for example, substantially the same as the first baffle second angle β, towards the first baffle 240. The first baffle second portion 244 is structured to guide the water towards the second baffle 250. The second baffle second portion 254 may serve as an overflow protector configured to inhibit water falling and collecting on the second baffle first portion 252 from overflowing over the second baffle 250. An edge of the second baffle second portion 254 distal from the second baffle first portion 252 may extend underneath the first baffle second portion 244 to ensure that all the water flowing towards the second baffle 250, from the first baffle second portion 244, is captured by the second baffle 250. Furthermore, the space between the first baffle 240 and the second baffle 250 allows the exhaust gas to flow therebetween towards the outlet 226 of the tube 220.

Figure 13:
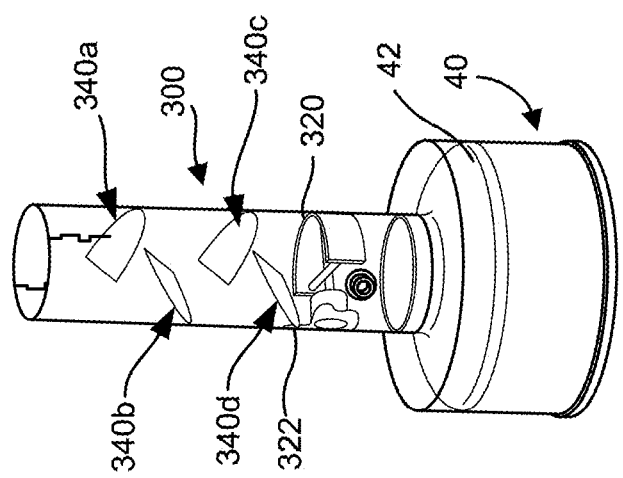
FIG. 13 is a schematic illustration of a water drainage assembly including a plurality of baffles, according to an embodiment.

FIG. 13 is a side perspective view of a water drainage assembly 300, according to another embodiment. The water drainage assembly 300 includes a tube 320 configured to be coupled to an outlet conduit 42 of an aftertreatment system 40. A first baffle 340a is coupled to an inner surface of the tube 320 at a first location, and inclined upwards from the inner surface of the tube 320 with respect to gravity. A second baffle 340b is coupled to the inner surface of the tube 320 at a second location that is opposite to and below the first location. The second baffle 340b is inclined upwards from the inner surface towards the first baffle 340a. A third baffle 340c that may be substantially similar to the first baffle 340a, is coupled to the inner surface of the tube 320 at a third location that is below the second location but on the same side as the first location, and inclined upwards towards the second baffle 340b. Similarly, a fourth baffle 340d, that may be substantially similar to the second baffle 340b, is coupled to the inner surface of the tube 320 at a fourth location that is below the third location but on the same side as the second location, and inclined upwards towards the third baffle 340c. Each baffle 340a/b/c/d may have a semi-circular shape. The baffles 340a/b/c/d serve as ramps to direct water towards the walls of tube 320 and eventually towards a drain port 322 defined at an end of the tube 320 proximate to the outlet conduit 42, while directing the exhaust gas towards an outlet of the tube 320.

Figure 14:
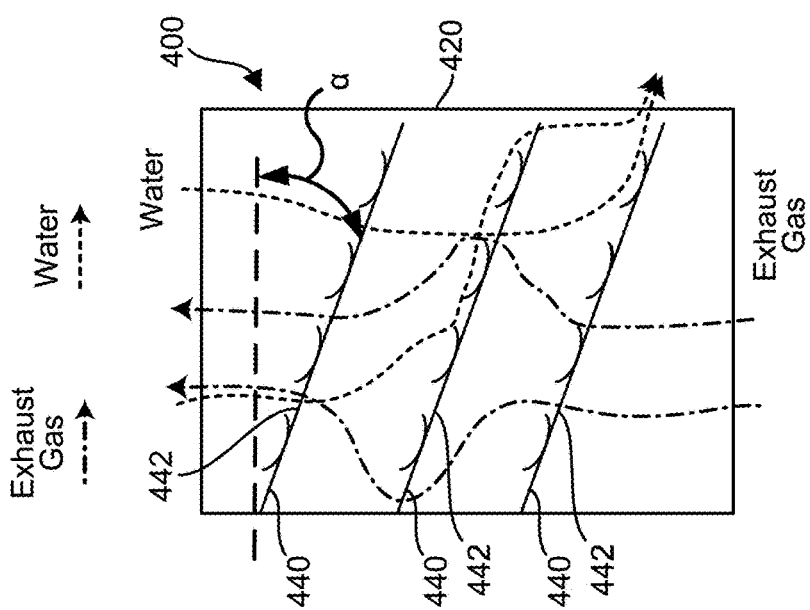
FIG. 14 is a schematic illustration of a water drainage assembly that includes a plurality of perforated plates disposed in a tube of the water drainage assembly, according to an embodiment.

FIG. 14 is an illustration of a water drainage assembly 400, according to another embodiment. The water drainage assembly 400 includes a tube 420 that may be structured to be coupled to an outlet conduit of an aftertreatment system (e.g., the outlet conduit 12, 22, 32, 42 of the aftertreatment system 10, 20, 30, 40). A plurality of baffles 440 are disposed at various locations along a length of the tube 420. Each of the plurality of baffles 440 is coupled to the inner surface of the tube 420 and is inclined at a downward angle α with respect to gravity. A plurality of pores 442 are defined through each of the plurality of baffles 440. Each of the plurality of pores 442 may be flared. In some embodiments, the pores 442 of each successive baffle 440 may be misaligned or staggered with respect to pores of an adjacent baffle 440. The pores 442 are structured to allow exhaust gas to flow therethrough and guide the flow of water towards a blocked portion of the baffle 440. Water entering the tube 420 flows downward on the top most baffle 440 and drops through the pores 442 thereof towards the adjacent baffle 440 located below the top most baffle 440, while flowing towards a wall of the tube 420. As the water flows through subsequent baffles 440, the water is guided towards the wall of the tube 420, and eventually out of a drain port 422 defined in the tube 420. Furthermore, the pores 442 allow the exhaust gas to flow therethrough towards an outlet of the tube 420.

Figure 15:
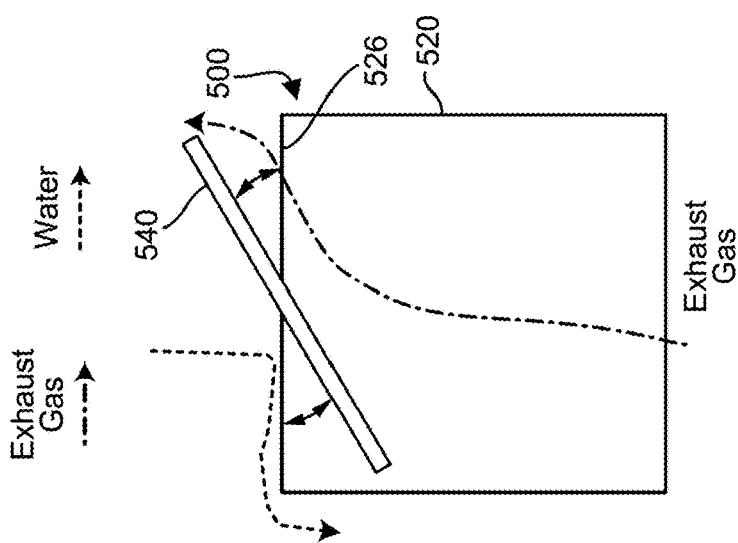
FIG. 15 is a schematic illustration of a water drainage assembly that includes a valve disposed at an outlet end of a tube of the water drainage assembly, according to an embodiment.

FIG. 15 is an illustration of a water drainage assembly 500, according to another embodiment. The water drainage assembly 500 includes a tube 520 that may be structured to be coupled to an outlet conduit of an aftertreatment system (e.g., the outlet conduit 12, 22, 32, 42 of the aftertreatment system 10, 20, 30, 40). A valve 540 is disposed at, or proximate to an outlet 526 of the tube 520. In some embodiments, the valve 540 may include a butterfly valve, a throttle valve, or a rotating plate mounted at the outlet 526. The valve 540 may be biased in a closed position (e.g., via a biasing member such as a spring) so as to close the outlet 526 when exhaust gas is not flowing towards the outlet 526 (e.g., when an engine coupled to the aftertreatment system is turned off). In the closed position, the valve 540 inhibits water from entering the tube 520. When exhaust gas is flowing through the tube 520, the exhaust gas pressure causes the valve 540 to rotate and move into an open position to allow the exhaust gas to flow out of the tube 520. In the open position, the valve 540 is oriented in an inclined position such that water falling on the valve 540 is guided by the surface of the valve 540 out of the tube 520, or towards a wall of the tube 520 towards a drain port (not shown) defined in the tube 520.

Figure 16:
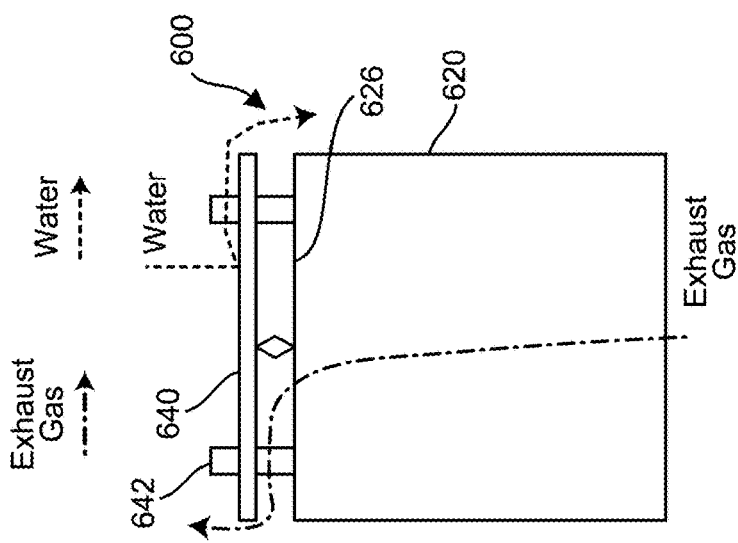
FIG. 16 is a schematic illustration of a water drainage assembly that includes a flap disposed at an outlet end of a tube of the water drainage assembly, according to an embodiment.

FIG. 16 is an illustration of a water drainage assembly 600, according to another embodiment. The water drainage assembly 600 includes a tube 620 that may be structured to be coupled to an outlet conduit of an aftertreatment system (e.g., the outlet conduit 12, 22, 32, 42 of the aftertreatment system 10, 20, 30, 40). A flap 640 (e.g., a flat plate) is mounted horizontally at an outlet 626 of the tube 620 via standoffs 642, such that a gap G is present between the flap 640 and the outlet 626. The flap 640 inhibits water from entering the tube 620, while allowing exhaust gas to flow through the gap G out of the outlet 626.

Figure 19:
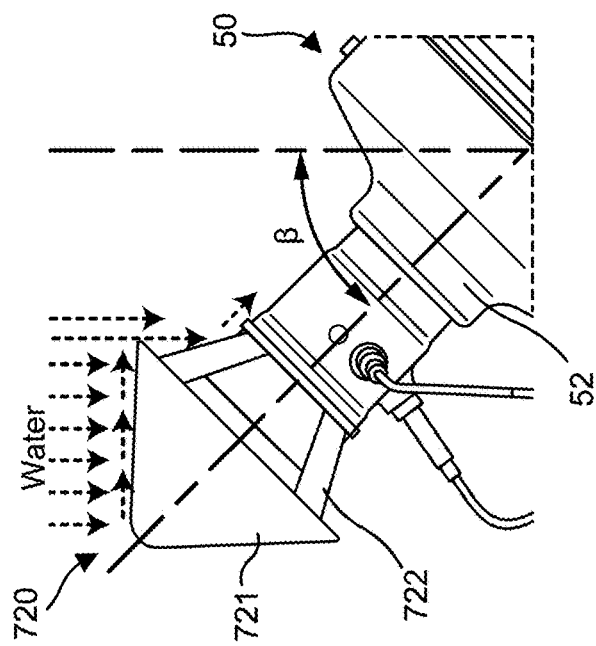
FIG. 19 is a side perspective view of the pipe cover of FIG. 17 coupled to an outlet conduit of the aftertreatment system that is inclined at an angle with respect to gravity, according to an embodiment.
Figure 18:
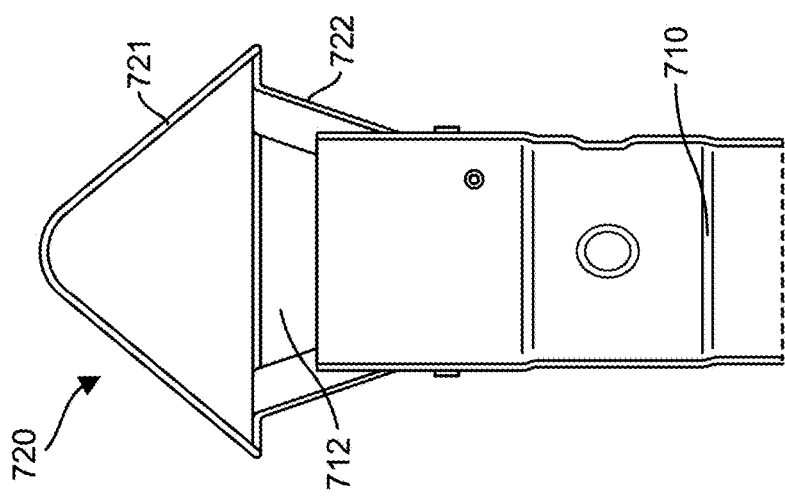
FIG. 18 is a side cross-section view of the pipe cover of FIG. 17 taken along the line B-B in FIG. 17.
Figure 17:
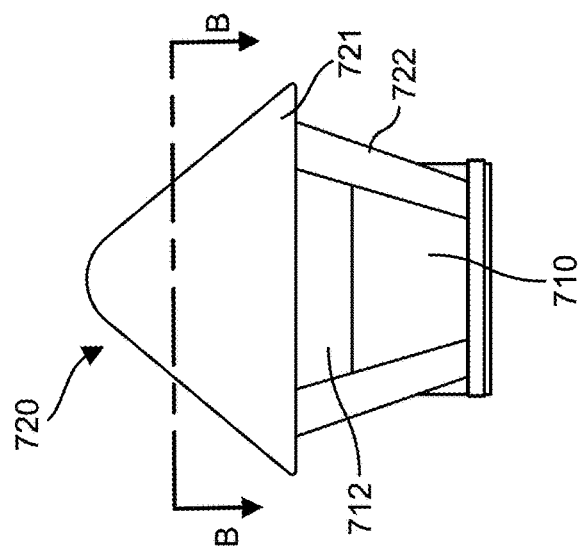
FIG. 17 is a side perspective view of a pipe cover coupled to an outlet conduit of an aftertreatment system and structured to inhibit water from entering the outlet conduit, according to an embodiment.

In some embodiments, a water drainage assembly may include a pipe cover (e.g., a chimney cover) coupled to an outlet conduit of an aftertreatment system, or to a tube (e.g., the first tube 110 or the second tube 120) coupled to the outlet conduit, to inhibits water from entering the aftertreatment system. Referring now to FIGS. 17-19, a pipe cover 720 is shown coupled to a tube 710 that may be coupled to an outlet conduit 52 an aftertreatment system 50. In some embodiments, the pipe cover 720 may be coupled directly to the outlet conduit 52 of the aftertreatment system 50 as shown in FIG. 19.

The pipe cover 720 includes a main body 721 configured to drive water away from the aftertreatment system 50. The main body 721 has a triangular cross-section. In other words, the main body 721 is substantially conical. The term "substantially conical" encompasses a conical shape with a curved top rather than a pointed top. The pipe cover 720 is coupled to the tube 710 via a plurality of arms 722 (e.g., a pair of arms as shown in FIGS. 17-19) that extend from the pipe cover 720 towards the tube 710 and is coupled thereto, such that a gap 712 is defined between adjacent arms of the plurality of arms 722 allowing the exhaust gas to flow out of the tube 710 through the gap 712. Each of the plurality of arms 722 may define a curvature. Furthermore, the plurality of arms 722 may be positioned such that when the aftertreatment system 50 and thereby, the pipe cover 720 is inclined at an angle ß with respect to gravity, at least one of the plurality of arm 722 faces the flow of water, and inhibits the water from entering the tube 710 and thereby, the aftertreatment system 50, as shown in FIG. 19.

Figure 20:
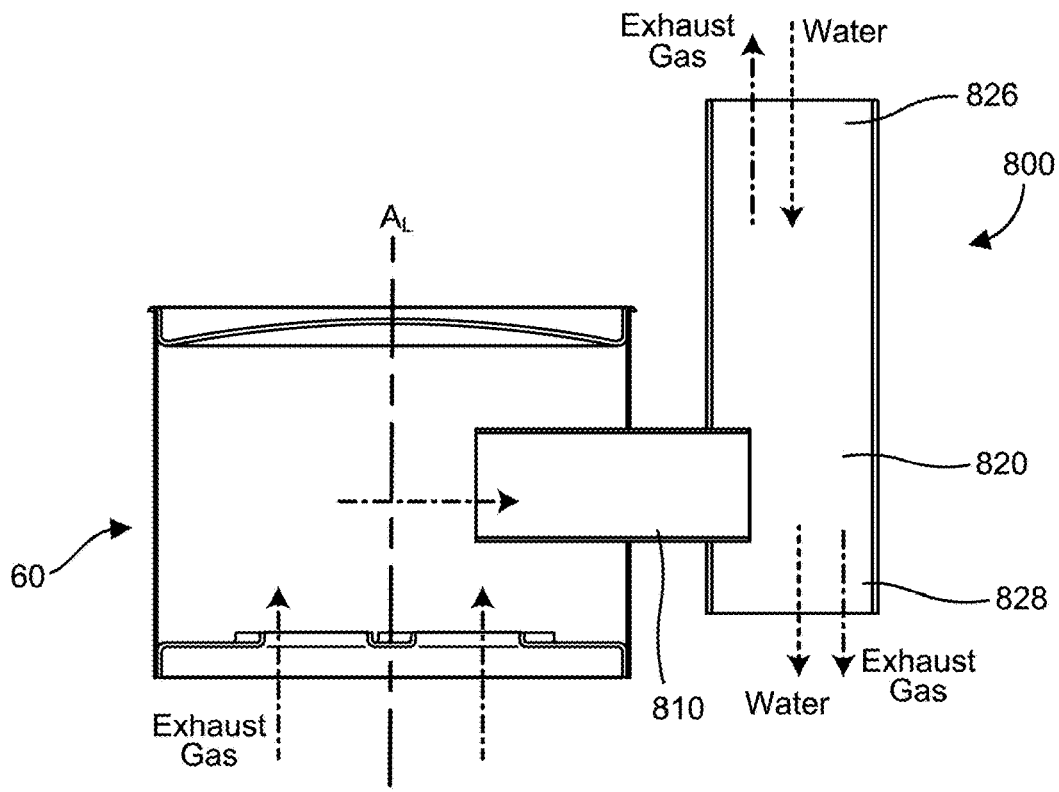
FIG. 20 is a side cross-section view of a water drainage assembly for an aftertreatment system, according to an embodiment.

FIG. 20 is a side cross-section view of a water drainage assembly 800 for an aftertreatment system 60, according to an embodiment. The water drainage assembly 800 includes a first tube 810 fluidly coupled to the aftertreatment system 60 that is oriented substantially perpendicular (e.g., in a range of 85 degrees to 95 degrees) with respect to a longitudinal axis $A_L$ of the aftertreatment system 60, the aftertreatment system 60 being vertically oriented with respect to gravity. A second tube 820 is fluidly coupled to first tube 810 and is oriented substantially parallel (e.g., in a range of −5 degrees to +5 degrees) of the longitudinal axis $A_L$ of the aftertreatment system 60. The second tube 820 is open at each of a first longitudinal end 826 and a second longitudinal end 828 that is located lower than the first longitudinal end 826 with respect to gravity. Exhaust gas flows from the aftertreatment system 60 through the first tube 810 into the second tube 820 and may exit the second tube 820 from any one of the first or second longitudinal end 826, 828. Furthermore, water enters the second tube 820 from the first longitudinal end 826 and exits the second tube 820 through the second longitudinal end 828 without entering the first tube 810.

Figure 21:
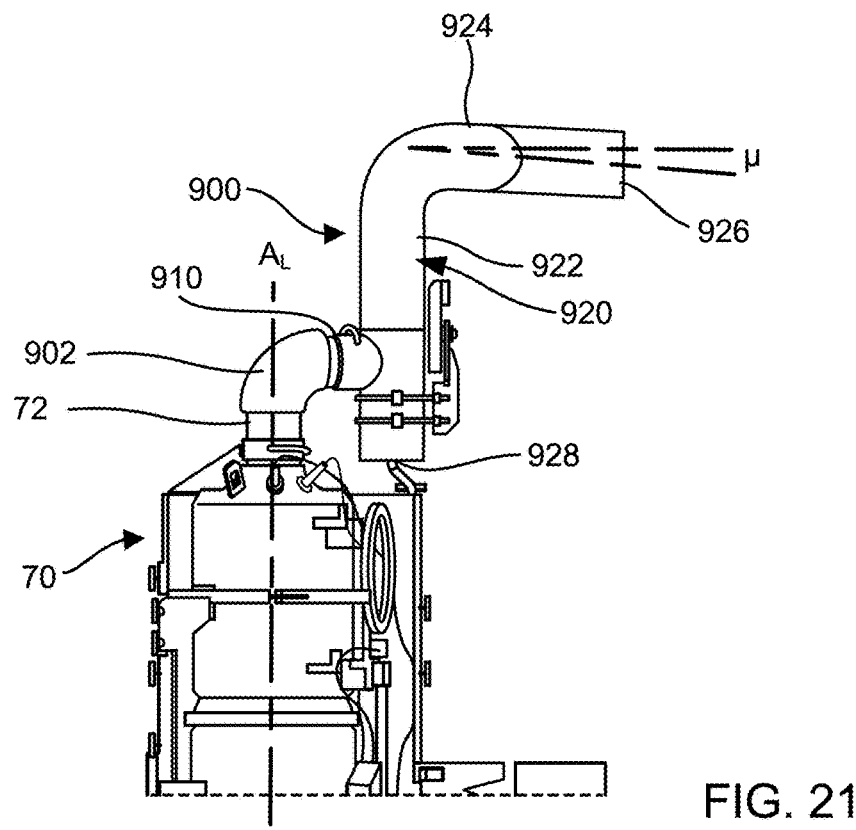
FIG. 21 is a side perspective view of a water drainage assembly coupled to an outlet conduit of an aftertreatment system that is oriented vertically with respect to gravity, according to an embodiment.

FIG. 21 is a perspective view of another water drainage assembly 900 coupled to an aftertreatment system 70, according to an embodiment. A longitudinal axis $A_L$ of the aftertreatment system 70 is oriented vertically with respect to gravity. An outlet conduit 72 extends from a longitudinal end of the aftertreatment system 70. The water drainage assembly 900 includes a first tube 910 and a second tube 920 as described with respect to the water drainage assembly 800. A connecting tube 902 including a 90 degree bend is used to couple the outlet conduit 72 to the first tube 910 so as to orient the first tube 910 substantially perpendicular with respect to the longitudinal axis $A_L$ of the aftertreatment system 70. Different from the water drainage assembly 900, the second tube 920 includes a bend such that a first portion 922 thereof is oriented substantially parallel to the longitudinal axis $A_L$ of the aftertreatment system 70, while a second portion 924 thereof, that is located downstream of the first portion 922 is oriented substantially perpendicular to the longitudinal axis $A_L$. In some embodiments, the second portion 924 may be oriented downwards at angle μ (e.g., in a range of 2 degrees to 5 degrees, inclusive) to reduce the likelihood of water entering an exhaust gas outlet 926 defined at an end of the second portion 924. A water outlet 928 is defined at an end of the first portion 922 that is distal from the second portion 924 and is configured to allow any water that enters the second tube 920 from exiting the second tube 920.

Figure 23:
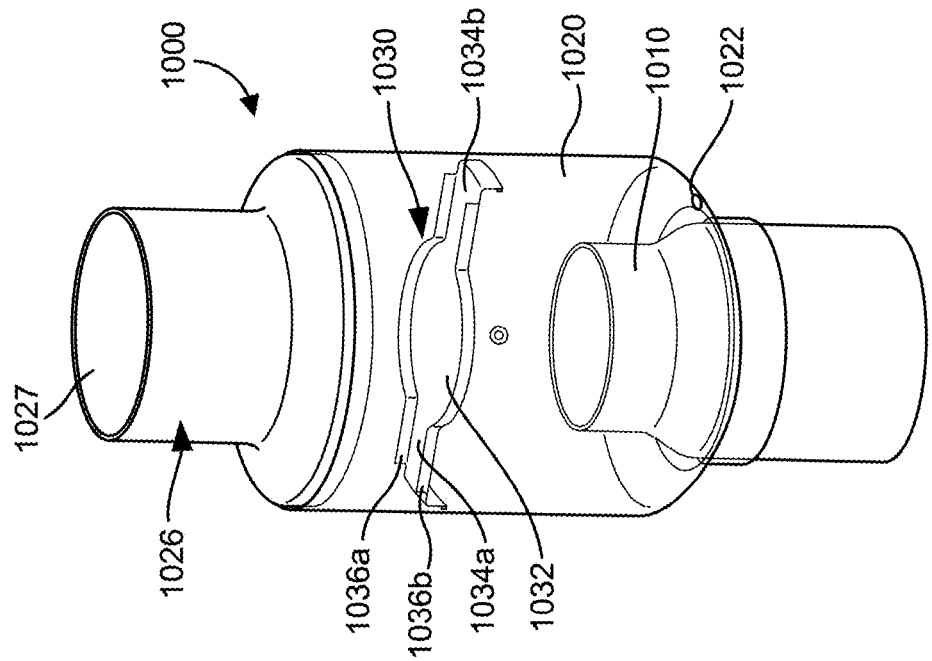
FIG. 23 is a side perspective view of the water drainage assembly of FIG. 22.
Figure 22:
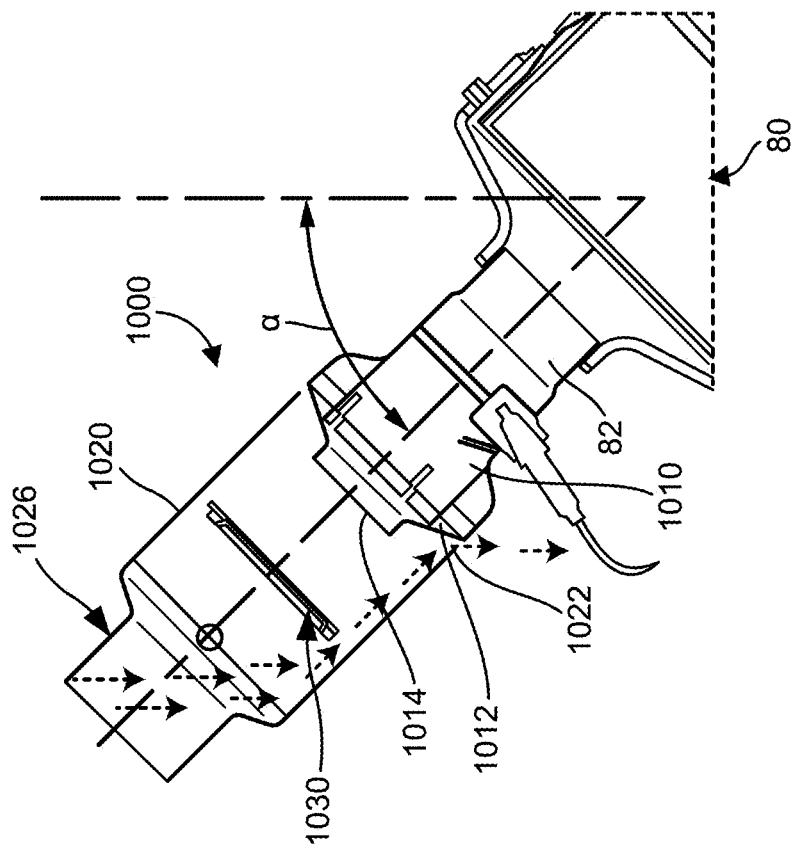
FIG. 22 is a side cross-section view of a water drainage assembly that includes a first tube coupled to an outlet conduit of an aftertreatment system, a second tube coupled to and disposed around the first tube, and a first flange coupled to a second end of the second tube that is distal from the first tube, according to an embodiment.

FIGS. 22-23 show a water drainage assembly 1000 for an aftertreatment system 80, according to another embodiment. The water drainage assembly 1000 includes a first tube 1010 coupled to an outlet conduit 82 of the aftertreatment system 80 (e.g., the aftertreatment system 10). A second tube 1020 is disposed circumferentially around the first tube 1010 and extends longitudinally away therefrom. A first end of the second tube 1020 is coupled to an outer surface of the first tube 1010. A portion of the second tube 1020 has a second diameter or otherwise cross-sectional width that is larger than a first diameter or otherwise cross-sectional width of the first tube 1010.

A first flange 1026 may be coupled to a second end of the second tube 1020 opposite the first end. The first flange 1026 defines a first flange outlet tube 1027 having a smaller cross-sectional width (e.g., diameter) than the second cross-sectional width (e.g., diameter). In some embodiments, a second flange 1012 (FIG. 22) may also be disposed in the second tube 1020 proximate to the first tube 1010. In some embodiments, the first tube 1010 may be excluded and the second flange 1012 may be coupled to an outlet of the aftertreatment system 80. The second flange 1012 may define a second flange inlet tube 1014 extending into the second tube 1020. In some embodiments, the second flange inlet tube 1014 may have a diameter corresponding to the diameter of the first flange outlet tube 1027.

The water drainage assembly 1000 also includes a baffle plate 1030 disposed in the second tube 1020. As shown in FIG. 23, the baffle plate 1030 includes a central portion 1032 having a cross-sectional width (e.g., diameter) equal to or larger than the cross-sectional width (e.g., diameter) of the first flange outlet tube 1027. The second flange 1012 is excluded from FIG. 23 for clarity. At least one arm extends from a periphery of the central portion 1032 and is attached to an inner surface of second tube 1020. For example, as shown in FIG. 23, a pair of arms 1034a/b extend from opposite ends of the central portion 1032 and are coupled to the inner surface of the second tube 1020 (e.g., welded thereto). In some embodiments, walls 1036a/b may extend from lateral edges of the baffle plate 1030. Water entering through the first flange outlet tube 1027 falls on the central portion 1032 that inhibits the water from entering the first tube 1010. Water flows around the central portion 1032, for example, guided by the walls 1036a/b towards the end of the arms 1034a/b, into the second tube 1020 around the first tube 1010 and expelled therefrom via a drain port 1022 defined in the second tube 1020.

Figure 24:
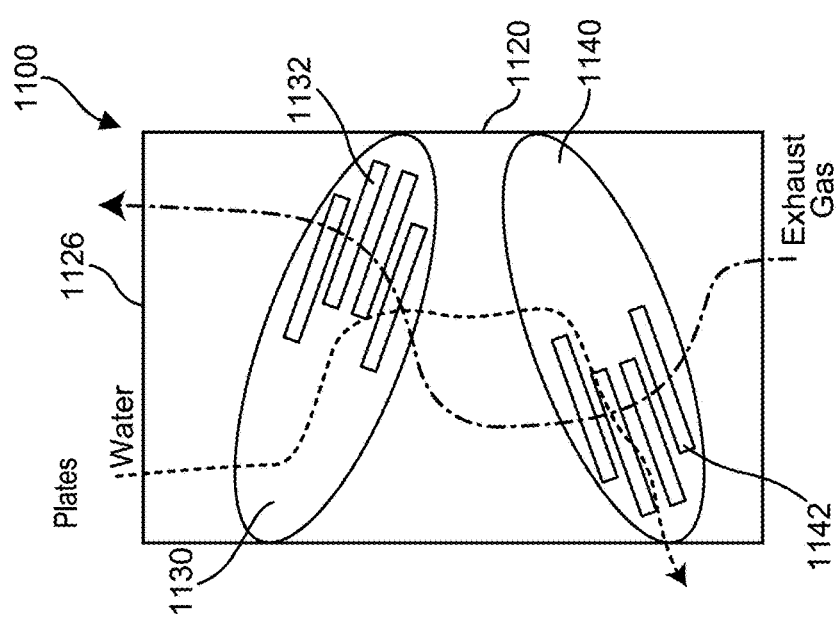
FIG. 24 is a schematic illustration of a water drainage assembly that includes a plurality of baffle plates having slots defined therein, according to an embodiment.

FIG. 24 is a schematic illustration of a water drainage assembly 1100 for use with an aftertreatment system according to an embodiment. The water drainage assembly 1100 includes a tube 1120 structured to be coupled to an outlet conduit of the aftertreatment system (e.g., the outlet conduit 12, 22, 32, 42, 52, 62, 72, 82 of the aftertreatment system 10, 20, 30, 40, 50, 60, 70, 80). A first baffle 1130 is disposed in the tube 1120 and is inclined at a first angle downwards with respect to gravity. A first set of slots 1132 are defined through the first baffle 1130 at first baffle location that is located at a lower elevation with respect to gravity. A second baffle 1140 is disposed below the first baffle 1130 and is inclined at a second angle in an opposite direction to the downwards inclination of the first baffle 1130. A second set of slots 1142 are also defined in the second baffle 1140 at a second baffle location that is distal from the first baffle location. While FIG. 24 shows the first set and second set of slots 1132, 1142 as being longitudinal slots, in other embodiments, the slots 1132, 1142 may include circular, square, elliptical or any other shape throughholes. Water flowing into the tube 1120 flows down the first baffle 1130 towards the first set of slots 1132 onto the second baffle 1140. Water then flows downs the second baffle 1140 towards the second set of slots 1142 and therethrough. The water may then be expelled from the tube 1120 via a drain port (not shown).

Figure 25:
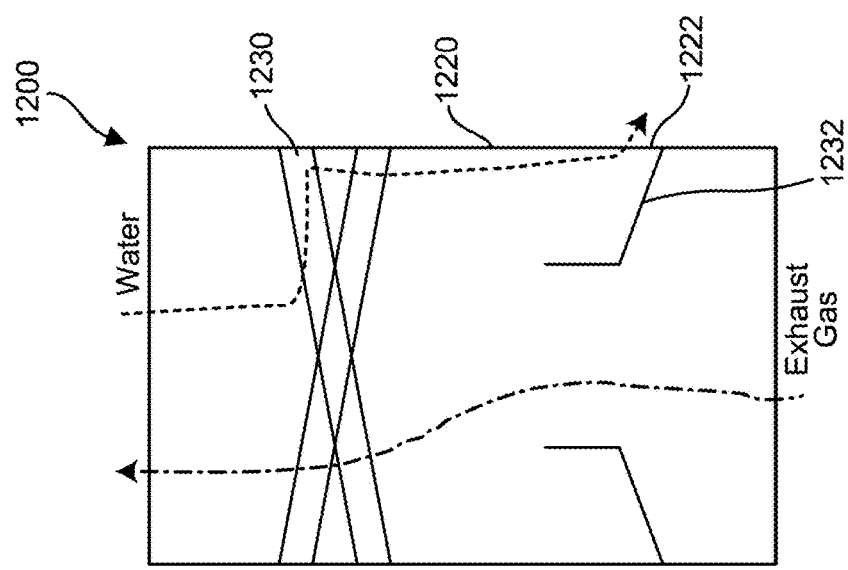
FIG. 25 is a schematic illustration of a water drainage assembly that includes a rotating blade configured, according to an embodiment.

FIG. 25 is a schematic illustration of a water drainage assembly 1200 for use with an aftertreatment system, according to another embodiment. The water drainage assembly 1200 includes a tube 1220 configured to be coupled to an outlet conduit of the aftertreatment system (e.g., the outlet conduit 12, 22, 32, 42, 52, 62, 72, 82 of the aftertreatment system 10, 20, 30, 40, 50, 60, 70, 80). A blade 1230 is disposed within the tube 1220, and configured to rotate. For example, a motor (not shown) may be operatively coupled to the blade 1230 and configured to selectively rotate the blade 1230, for example, in situations when it is raining. In some embodiments, the blade 1230 may include a blade assembly having a pair of spinning blades (e.g., counter-rotating blades). The rotation of the blade 1230 propels any water entering the tube 1220 radially outwards via centrifugal force towards an inner surface of the tube 1220. A ramp 1232, for example, a circumferential ramp, is coupled to the inner surface of the tube 1220 and is inclined downwards to the inner surface of the tube 1220 towards a drain port 1222 defined through the tube 1220 to allow the water to be expelled from the tube 1220.

Figure 26:
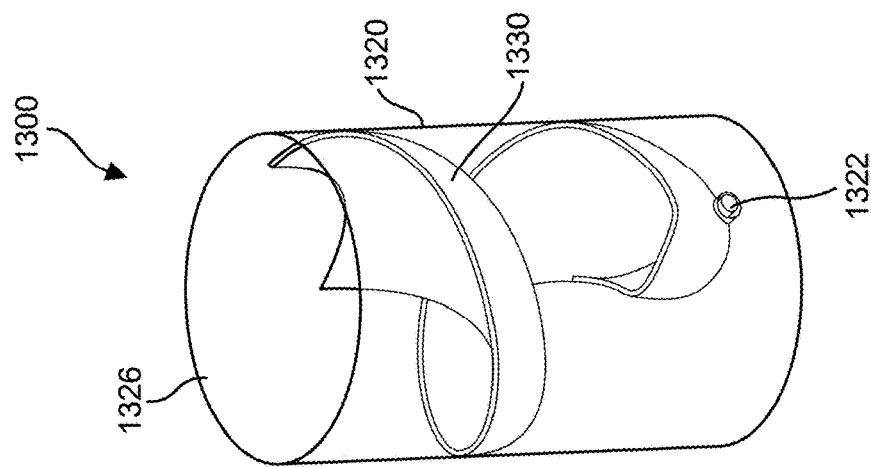
FIG. 26 is a side perspective view of a water drainage assembly that includes a helical ramp disposed within a tube, according to an embodiment.

FIG. 26 is a side perspective view of a water drainage assembly 1300, according to still another embodiment. The water drainage assembly 1300 includes a tube 1320 configured to be coupled to an outlet conduit of the aftertreatment system (e.g., the outlet conduit 12, 22, 32, 42, 52, 62, 72, 82 of the aftertreatment system 10, 20, 30, 40, 50, 60, 70, 80). The water drainage assembly 1300 includes a helical ramp 1330 (the tube 1320 is shown as translucent to show the helical ramp 1330 disposed therein). A first end of the ramp 1330 is disposed proximate to an outlet 1326 of the tube 1320, and a second end of the ramp 1330 opposite the first end is coupled to an inner surface of the ramp 1330 at a location where a drain port 1322 is defined through the tube 1320. The ramp 1330 has a curved shape (e.g., a hemispherical shape) and is structured such that water entering the tube 1320 flows on the ramp 1330 towards the drain port 1322, wherefrom the water is expelled from the tube 1320.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples)

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various embodiments presented herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A water drainage assembly for an aftertreatment system, comprising:
    a first tube configured to be coupled to an outlet conduit of the aftertreatment system;
    a second tube having a first end coupled to an outer surface of the first tube, a second end opposite the first end, and an intermediate portion located between the first end and the second end; and
    a baffle plate located in the second tube; wherein:
    the intermediate portion of the second tube surrounds an end portion of the first tube such that a volume is defined between the end portion of the first tube and the intermediate portion of the second tube; and the second tube comprises a drain port configured to allow water to drain from the volume defined between the end portion of the first tube and the intermediate portion of the second tube; and the baffle plate comprises:
 a central portion, and
 exactly two arms extending from a periphery of the central portion and attached to an inner surface of the second tube,
 wherein the central portion is spaced from the inner surface of the second tube by a gap through which exhaust is able to flow.

2. The water drainage assembly of claim 1, wherein the arms extend in directly opposite directions from the central portion.

3. The water drainage assembly of claim 1, wherein an entirety of an upper surface of the central portion is planar.

4. The water drainage assembly of claim 1, wherein:
the baffle plate comprises walls extending from edges of the central portion and the least one arms in a direction toward the second end of the second tube.

5. The water drainage assembly of claim 4, wherein:
gaps are located between the walls extending from the edges of the arms and the inner surface of the second tube, such that water is able to flow from the arms through the gaps to the volume defined between the end portion of the first tube and the intermediate portion of the second tube.

6. The water drainage assembly of claim 1, wherein:
the arms comprise a first arm extending from the periphery of the central portion at a first location, and a second arm extending from the periphery of the central portion at a second location opposite the first location.

7. The water drainage assembly of claim 6, wherein:
the baffle plate comprises walls extending from edges of the central portion and the first and second arms in a direction toward the second end of the second tube.

8. The water drainage assembly of claim 7, wherein:
gaps are located between the walls extending from the edges of the first and second arms and the inner surface of the second tube, such that water is able to flow from the first and second arms through the gaps to the volume defined between the end portion of the first tube and the intermediate portion of the second tube.

9. The water drainage assembly of claim 1, wherein:
the second tube comprises an outlet tube at its second end, a width of the outlet tube being less than a width of the intermediate portion of the second tube.

10. The water drainage assembly of claim 9, wherein:
a width of the central portion is equal to or larger than the width of the outlet tube of the second tube.

11. The water drainage assembly of claim 9, wherein:
the outlet tube is cylindrical and the central portion of the baffle plate is circular; and
a diameter of the central portion is equal to or larger than a diameter of the outlet tube.

12. A water drainage assembly for an aftertreatment system, comprising:
a flange coupled to an outlet conduit of the aftertreatment system;
a tube having a first end coupled to an outer surface of the flange, a second end opposite the first end, and an intermediate portion located between the first end and the second end; and
a baffle plate located in the tube; wherein:
the intermediate portion of the tube surrounds the flange such that a volume is defined between the flange and the intermediate portion of the tube; and
the tube comprises a drain port configured to allow water to drain from the volume defined between the inlet tube of the flange and the intermediate portion of the tube; and
the baffle plate comprises:
 a central portion, and
 exactly two arms extending from a periphery of the central portion and attached to an inner surface of the tube,
 wherein the central portion is spaced from the inner surface of the tube by a gap through which exhaust is able to flow.

13. The water drainage assembly of claim 12, wherein:
the baffle plate comprises walls extending from edges of the central portion and the arms in a direction toward the second end of the tube.

14. The water drainage assembly of claim 13, wherein:
gaps are located between the walls extending from the edges of the arms and the inner surface of the tube, such that water is able to flow from the arms through the gaps to the volume defined between an end portion of the flange and the intermediate portion of the tube.

15. The water drainage assembly of claim 12, wherein:
the arms comprises a first arm extending from the periphery of the central portion at a first location, and a second arm extending from the periphery of the central portion at a second location opposite the first location.

16. The water drainage assembly of claim 15, wherein:
the baffle plate comprises walls extending from edges of the central portion and the first and second arms in a direction toward the second end of the tube.

17. The water drainage assembly of claim 16, wherein:
gaps are located between the walls extending from the edges of the first and second arms and the inner surface of the tube, such that water is able to flow from the first and second arms through the gaps to the volume defined between an end portion of the flange and the intermediate portion of the tube.

18. The water drainage assembly of claim 12, wherein:
the tube comprises an outlet tube at its second end, a width of the outlet tube being less than a width of the intermediate portion of the tube.

19. The water drainage assembly of claim 18, wherein:
a width of the central portion is equal to or larger than the width of the outlet tube of the tube.

20. The water drainage assembly of claim 18, wherein:
the outlet tube is cylindrical and the central portion of the baffle plate is circular; and
a diameter of the central portion is equal to or larger than a diameter of the outlet tube.

* * * * *